May 29, 1934.  E. S. MIX  1,961,067
COMPASS BELT FOR PERSONAL WEAR
Filed Dec. 3, 1931
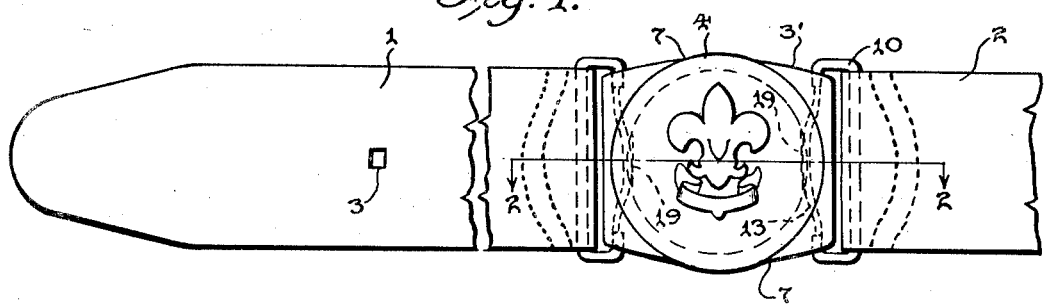
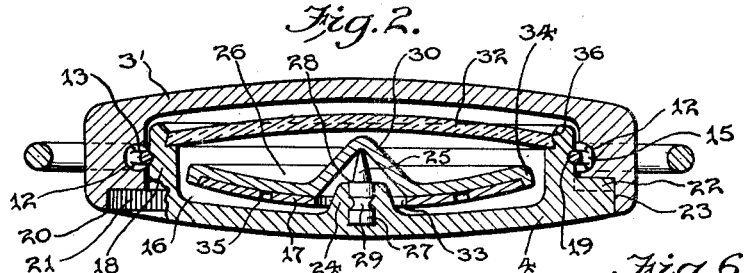
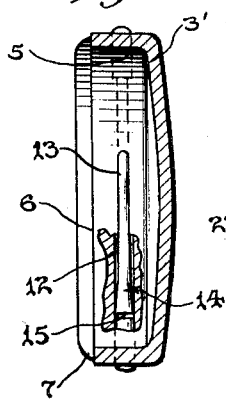
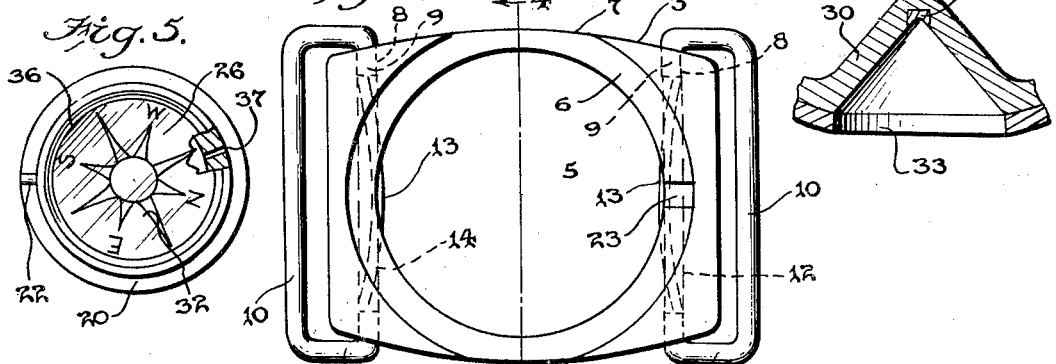
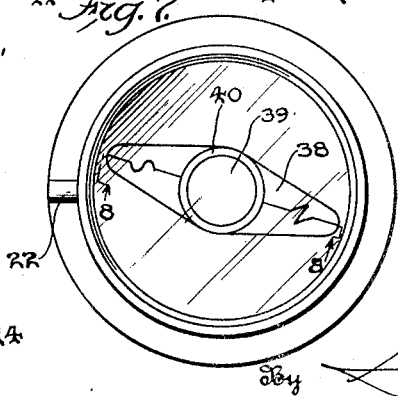
Inventor
Edwin S. Mix,
By
Attorney Patented May 29, 1934

1,961,067

UNITED STATES PATENT OFFICE 1,961,067

COMPASS BELT FOR PERSONAL WEAR

Edwin S. Mix, Rochester, N. Y., assignor to Hickok Manufacturing Company, Inc., Rochester, N. Y., a corporation of New York Application December 3, 1931, Serial No. 578,781

11 Claims. (Cl. 224—4)

The invention primarily relates to a compass belt for personal wear.

The invention according to certain broad aspects relates to an instrument construction which can be used to advantage in conjunction with or as part of a belt for personal wear.

The invention according to certain other broad aspects thereof relates to an instrument casing construction, to-wit a casing construction originally designed for use as a part of a compass or for embodying a compass needle and according to still other broad aspects the casing construction is applicable for and useful in other form of instruments among which may be mentioned a watch, a thermometer, a barometer or even instruments of other types.

The object of the present invention is to provide for personal wear a compass belt equipped with a two piece compass consisting of a body case constituting a portion of the length of the belt and a separable compass casing carrying the magnetic needle and adapted to be separated from the body case for observation and capable of being securely retained in the body case with the compass mechanism fully protected when not in use.

A further object of the invention is to provide a compass belt of this character equipped with means for properly positioning the compass casing in the body case with relation to concealed interiorly arranged fastening means and any insignia or ornamentation on the exterior of the compass casing so that the latter may be quickly returned to its proper protected position within the body case.

With these and other objects in view, the invention consists in the novel combination and arrangement of parts hereinafter fully described, illustrated in the accompanying drawing, and pointed out in the claims hereto appended, it being understood that various changes in the form, proportion and minor details of construction within the scope of the appended claims may be resorted to without departing from the spirit or sacrificing any of the advantages of the invention.

In the drawing:—

Figure 1 is a front elevation of a compass belt constructed in accordance with this invention.

Fig. 2 is a longitudinal sectional view of the same on the line 2—2 of Fig. 1.

Fig. 3 is an elevation of the body case, the compass casing being removed.

Fig. 4 is a vertical sectional view of the same on the line 4—4 of Fig. 3.

Fig. 5 is a plan view of the compass dial.

Fig. 6 is an enlarged detail view of the central bearing portion of the compass dial illustrating the arrangement of a rock crystal jewel in the bearing portion thereof.

Fig. 7 is a plan view of the compass casing illustrating another form of magnetic needle.

Fig. 8 is a sectional view taken substantially on the line 8—8 of Fig. 7.

In the accompanying drawing in which are illustrated the preferred embodiments of the invention the compass belt comprises belt sections 1 and 2, the section 1 being provided with holes 3 for the reception of the tongue of a buckle, not shown, with which the section 2, in practice, will be provided. The compass which is a two piece separable compass is composed of a body case 3' and a removable compass casing 4 which is separable from the body case for observation in use of the compass. The casing 4 which is described as a removable compass casing may be considered as a removable instrument-containing casing or even as an instrument-receiving casing since types of instruments other than compasses or compass providing elements as a compass needle member may be supported in the casing for example an instrument such as a watch, a thermometer, a barometer or even of some other type. The body case which is substantially oblong is designed to be constructed of molded bakelite or other suitable plastic material, but any suitable material may, of course, be employed in the construction of the compass.

The body case is provided with a circular or cylindrical chamber 5 for the reception of the compass casing and it has an annular seat 6 which is open at the sides of the body portion at 7 to permit the compass casing to project laterally beyond the side edges or faces of the body case, whereby the compass casing may be readily grasped between the thumb and fingers for removing the compass casing from the body case.

The end portions of the body case are provided at opposite sides with bearing recesses 8 for the reception of pivots 9 of end bars 10 which have their terminal portions bent at right angles to form arms 11 and the said pivots 9, as clearly illustrated in Fig. 3 of the drawing.

The arms 11 space the bars from the ends of the body case to provide loops through which the adjacent end portions of the belt sections are adapted to be passed for securing the body case to the said belt sections. The inner ends of the belt sections 1 and 2 are preferably stitched after being passed through the openings formed by the bars 10 for securing the said terminals of the belt sections to the body portions of the said sections, but any suitable means may, of course, be employed for securing the belt sections to the bars 10 which are permitted to swing in movement by their pivotal connection to the ends of the body case. By this construction the body case is flexibly connected with the sections 1 and 2 of the belt and it constitutes a portion of the length of the belt. The chamber opens outwardly and the compass casing, as hereinafter fully described, may be removed from and replaced in the said chamber without removing the belt or twisting the same.

The bearing recesses are connected by transverse bores or openings 12 which intersect the wall of the chamber 5 at the ends of the body case and communicate with the said chamber for exposing centrally bowed portions 13 of spring fastening devices 14 consisting of pieces of spring wire or other suitable resilient material arranged in the said bores or openings and having the said centrally bowed portions 13 projecting into the chamber 5 at the ends of the body case. The spring fastening devices which are concealed within the compass casing when the compass casing is in place are flattened and tapered at one end portion 15 to enable the springs formed by the strips or pieces of spring metal to be wedged in the transverse bores or openings.

The tapered portions of the springs bite into the walls of the transverse openings 12 and the said springs are securely confined in the openings when the swinging bars 10 are assembled. The bearings recesses 9 may be of the same diameter as the transverse openings 12 and may be formed by the terminal portions of the transverse openings but the latter may, of course, be of a different diameter, if desired.

The compass casing which is circular is provided with a chamber 16 for the reception of a magnetic needle 17 and the compass casing which is arranged in a vertical position when housed within the chamber of the body case is removed therefrom for use and when arranged in a horizontal position consists of a bottom wall and an annular or cylindrical wall 18 which fits snugly within the chamber of the body case and which is provided at opposite sides with shallow grooves 19 adapted to be engaged by the bowed portions of the spring fastening devices, as clearly illustrated in Fig. 2 of the drawing. The grooves 19 which are tapered longitudinally permit the compass casing to be readily engaged with the spring fastening devices by simply pressing the compass casing into the chamber of the body case and to be disengaged from the spring fastening devices by pulling the compass casing out of the chamber of the body case.

The compass casing is provided at the bottom or outer wall which forms the base of the chamber with a projecting annular flange 20 having a milled edge 21 and projecting laterally beyond the body case through the seat openings 7 at opposite sides of the said body case.

This will enable the compass casing to be readily grasped between the thumb and fingers for removing the compass casing from the body case.

The compass casing is provided with a lug 22 located at the inner face of the flange 20 and projecting exteriorly of the annular wall of the compass casing and fitting in a recess 23 in the annular seat 6 of the body case. The lug is adapted to engage the recess and forms a guide for returning the compass casing to the body case so that the compass casing will be properly positioned in the body case with relation to the spring fastening devices thereof and at the same time will enable the compass casing to be replaced in the body case with any insignia or ornamentation of the compass casing in an upright or proper position. Also the lug 22 and the recess 23 will prevent any rotary movement of the circular compass casing in the annular chamber of the body case.

The outer wall which constitutes the body portion of the compass casing is slightly concavo-convex, as clearly illustrated in Fig. 2 of the drawing, and it is provided with a central boss 24 in which a pivot pin 25 is molded in the formation of the compass casing. The compass casing is molded from bakelite or other plastic material similar to the body case, but it may, of course, be constructed of any suitable material as will be readily understood. The pivot pin 25 which receives and supports a rotating or floating compass dial 26 is provided with a cylindrical shank 27 presenting a shoulder 28 at the upper or inner end to facilitate positioning the pivot pin in a mold and the shank is provided intermediate of its ends with an annular groove 29 into which the material falls, whereby the pivot pin is keyed in the bakelite.

The compass dial which is shown, described and claimed in my copending application Serial No. 595,374 filed February 26, 1932, which in turn is a division of my co-pending application Serial No. 578,150 filed Nov. 30, 1931, is constructed of molded bakelite or other plastic material, but it may be constructed of any suitable material, as will be readily understood and it is concavo convex and provided at the center with a hollow cone 30. The projecting pivot portion of the pivot pin is conical and is adapted to fit in the cone bearing of the concavo convex dial which presents a concave upper face and a convex lower face and has the said hollow central conical portion which is adapted to permit a free floating action of the dial. The compass dial is a direct reading dial and in practice will have the cardinal and other points of the compass engraved or otherwise marked on its upper concave face. In practice the bakelite dial will be molded with highly polished molds and under a sufficient heat to produce a highly polished surface which ordinarily will not require a crystal bearing for the pivot pin, but if desired, a crystal bearing 31 may be provided, as clearly shown in Fig. 6 of the drawing. When the crystal bearing 31 is employed it will be embedded in the bakelite or other plastic material as shown. The hard surface of the bakelite is characteristic of this material in that the gums contained therein tend to gravitate toward the surface in the baking process producing an intensely fine hard grain under the action of the baking heat essential to this type of product.

The concavo convex disk presents a lower convex surface to the bottom wall of the chamber of the compass casing and with its centrally arranged hollow cone lowers the center of gravity and eliminates the major portion of the clearance which usually occurs between floating dials and the bottom walls of the chambers in which they are mounted and thereby reduces the thickness of the compass and provides a comparatively very thin compass which is especially adapted for use in belts for personal wear. The curvature of the compass dial and the curvature of the bottom wall of the compass casing, as illustrated in Fig. 2 of the drawing, enables a much thinner over all assembly to be constructed than has been possible with compasses having dials of the ordinary construction and at the same time, free movement and accuracy of operation of the compass dial is assured. Also, the lowering of the center of gravity provides greater steadiness in the floating action of the dial of the compass when the same is in a horizontal position and permits the bearing portion of the hollow cone to slide off the end of the pivot pin when the compass is arranged in its normal vertical position. This will enable the dial to rest against the crystal 32 and also the wall of the chamber of the compass casing at the bottom thereof and to be seated in a firm supported position practically independently of the pivot pin, thereby preventing any floating action or vibration of the dial when the same is in a vertical position and not in use, and at the same time the seating of the compass dial on the compass casing relieves the point of the pivot pin of strain.

The magnetic needle 17 which is constructed of magnetic metal in sheet form is oppositely tapered and is provided with a central opening 33 which is of the same diameter as the base of the hollow cone to permit the boss 24 and the pivot pin to extend into the hollow cone. This brings the lower face of the magnetic needle in close proximity to the bottom wall of the chamber of the compass casing, but at the same time, provides all the necessary clearance for an accurate floating operation of the dial. The magnetic needle is curved longitudinally to present a concave upper face and a convex lower face to conform to the configuration of the lower face of the compass dial and it is molded in the bakelite or other plastic material of the dial in the formation of the latter as an insert thereof. The bakelite provides a marginal bead 34 around the entire periphery of the magnetic needle which is keyed in the bakelite by a marginal burr formed by stamping out the magnetic needle. An integral unit is thereby formed of the dial and magnetic needle which is provided at its end portions with holes 35 spaced from the central opening 33 and adapted to receive mold pins for properly positioning the magnetic needle in the mold with relation to the engraving or other markings of the cardinal points and other points of the compass on the upper concave face of the compass dial.

The crystal 32 which is preferably of the non-breakable type is seated in an annular groove 36 in the cylindrical wall of the compass casing.

The annular groove 36 is undercut to form an inclined wall to retain the crystal on the seat formed by the said groove 36. The crystal is snapped into the groove similar to a watch crystal and should it be desired to remove the crystal to correct adjustment or for replacement or repair or any other purpose, compressed air is introduced into the chamber through a hole 37 for the purpose of blowing the crystal off its seat.

In Figs. 7 and 8 is illustrated another form of the invention in which the magnetic needle 38 is provided with a hollow metallic cone 39 having an annular flange 40 at its base secured to the upper face of the magnetic needle 38 around the central opening 41. The magnetic needle 38 is of substantially the same form as the magnetic needle 17 and is tapered in width longitudinally from the center to each end and has engraved or otherwise marked on its upper face the letters "N" and "S" indicating the North seeking end and South seeking end of the magnetic needle.

The hollow cone 39 forms a cone bearing and is provided with a crystal jewel 42 resting on the point of the pivot pin. The annular flange 40 of the hollow cone may be secured to the upper face of the magnetic needle in any suitable manner and the curvature of the magnetic needle and the hollow cone operates as heretofore described, in reducing the clearance space between the magnetic needle and the bottom of the compass casing to a minimum and also to lower the center of gravity of the magnetic needle to insure greater steadiness in the floating action of the compass.

Also the cone bearing of the magnetic needle is adapted to slide off the point of the pivot pin to permit the magnetic needle to seat against the compass casing when the latter is in a vertical position, thereby preventing vibration and relieving the pivot pin of strain.

What is claimed is:

1. An instrument construction comprising a body case provided with a chamber opening outwardly, an instrument-receiving casing removably fitted in the said chamber and normally forming a closure for the same and having the instrument-receiving chamber in its inner face, automatically operating normally concealed fastening means carried by the body case for securing the instrument-receiving casing in the chamber, said instrument-receiving casing having a laterally projecting rim portion extending beyond the body case to facilitate removal of the instrument-receiving casing from its normal closure position for said chamber.

2. An instrument construction comprising a body case having a cylindrical chamber opening outwardly, said chamber being concentrically enlarged at its opening to form an annular seat, said enlargement opening through the side of said case, and a cylindrical casing removably fitted in the said chamber and forming a closure for the same and having a flange arranged to fit into the enlargement and to rest on the said seat and projecting through the opening thereof to facilitate removal of the casing, said casing having an instrument receiving chamber open at its inner face.

3. An article of manufacture including in combination a body case provided with an outwardly opening annular chamber and having a transverse opening communicating with the said chamber, a spring arranged in the said opening and having a portion projecting into the chamber, and a cylindrical casing removably fitted in the chamber and forming a closure for the same and having means coacting with the projecting portion of the spring for securing the casing in the chamber.

4. An article of manufacture including a body case provided with an outwardly opening annular chamber and having a transverse opening communicating at a point between its ends with the said chamber, a spring mounted in the said opening and provided between its ends with a bowed portion projecting into the said chamber, and a cylindrical casing removably fitted in the said chamber and forming a closure for the same and provided with a groove arranged to be engaged by the bowed portion of the spring, said casing having an inwardly opening receiving chamber.

5. An article of manufacture including a body case provided with an outwardly opening annular chamber and having a transverse opening communicating with the chamber, a spring arranged in the said transverse opening and having a portion projecting into the chamber, said spring being provided at one end with a flattened tapered portion engaging the walls of the transverse opening to retain the spring in position, and a cylindrical casing fitting the chamber of the body case and forming a closure for the same and engaged by the said spring, said casing having an inwardly opening receiving chamber.

6. An article of manufacture for use in a belt, said article comprising a body case having an outwardly opening chamber and provided with transverse openings communicating between their ends with the said chamber, springs mounted in the said transverse openings and having portions extending into the said chamber, bars for providing connections with the belt sections and provided with pivots arranged in the terminal portions of the transverse openings and confining the springs therein, and a cylindrical casing movable into and out of said opening and engaged by the said springs, said casing forming a closure for the said opening and having an inwardly opening receiving chamber.

7. A body case provided with a cylindrical chamber opening outwardly, a fastening device arranged within the body case and carried thereby, a cylindrical casing fitting the cylindrical chamber of the body case and removable therefrom and forming a closure for said chamber, which cylindrical casing is shaped so as to receive a portion of the fastening device when the cylindrical casing is in fitting position with respect to the cylindrical chamber of the body case, and means for positioning the cylindrical casing with respect to the fastening device as and when the cylindrical casing is inserted into the chamber of the body case, of which last mentioned means one part is carried by the body case and another part by the cylindrical casing, said fastening device being concealed when the cylindrical casing is in full inserted or fitting position with respect to the chamber of the body case.

8. In an instrument construction a body case provided with a cylindrical chamber opening outwardly, a normally concealed fastening device arranged within the body case and carried thereby, a cylindrical instrument-containing casing fitted in the chamber of the body case and having a groove adapted to be engaged by said fastening device, said instrument-containing casing normally forming a closure for the body case and means for insuring a positioning of the cylindrical instrument-containing casing in and with respect to the body case and thereby with respect to said fastening device as the instrument-containing casing is inserted into its normal closure position with respect to the body case.

9. An instrument construction for use with or as part of a belt, which instrument construction comprises a body case provided with a cylindrical chamber opening outwardly, a fastening device arranged within the body case, a cylindrical instrument-receiving casing fitted in the chamber of the body case and having a groove adapted to be engaged by a part of said fastening device, said cylindrical casing having an instrument-receiving chamber opening at the inner face of the cylindrical casing, which cylindrical casing provides a closure for the chamber of the body case, said fastening device being concealed when said cylindrical casing is serving as a closure for the body case, and a lug carried by the cylindrical casing and engageable with a notched portion of the body case for insuring the proper positioning of the cylindrical casing with respect to said fastening device.

10. A body case and a casing, said body case having a chamber opening outwardly and constructed so as to provide an inner cylindrical section and an outer enlarged section concentric with the inner section and so that the enlarged section provides a seat for a rim section or annular flange of the casing, said body case being shaped so that said enlarged section opens through the sides of said body case, said casing having a cylindrical extension that fits the inner cylindrical section of the chambered opening of the body case and also having a rim section or annular flange portion that engages the seat provided by the outer enlarged section of the chamber opening of the body case, said rim section or annular flange portion being of such diameter that it projects through the side openings to points beyond the body case to facilitate removal of the casing, said casing being shaped so that it provides a receiving chamber open at its inner face.

11. A receptacle construction having a body case constructed so as to provide an outwardly opening annular chamber, so as to provide an annular seat surrounding the chamber and so as to have side openings leading from the exterior of the body case to the space above said annular seat, said body case also being constructed so as to provide a recessed portion that constitutes part of a positioning and guiding means, said receptacle construction also having a cylindrical receiving casing which is constructed so as to provide an outer flanged portion and an inwardly extending wall whereby there is provided an inwardly opening receiving chamber, said receiving casing being constructed so that it removably fits in said chamber of the body case and forms a closure for the latter and being constructed so that when fitted into place said flanged portion seats on said annular seat of the body case and projects through said side openings, said receiving casing also being constructed so as to have a projecting lug that fits into the recessed portion of the annular seat whereby said recessed portion and said lug constitute said guiding and positioning means previously referred to, said body case and said receiving casing having coacting parts that engage each other in a manner to lock and retain the casing in said chamber when fitted therein and positioned by said positioning and guiding means.

EDWIN S. MIX.